(12) United States Patent
Fuhst et al.

(10) Patent No.: US 7,575,056 B2
(45) Date of Patent: Aug. 18, 2009

(54) TUBULAR CUTTING DEVICE

(75) Inventors: Karsten Fuhst, Hannover (DE); Sven Krueger, Winsen (DE); Matthias Moeller, Braunschweig (DE)

(73) Assignee: Baker Hughes Incorporated, Houston, TX (US)

( * ) Notice: Subject to any disclaimer, the term of this patent is extended or adjusted under 35 U.S.C. 154(b) by 211 days.

(21) Appl. No.: 11/728,515

(22) Filed: Mar. 26, 2007

(65) Prior Publication Data

US 2008/0236828 A1    Oct. 2, 2008

(51) Int. Cl.
    *E21B 29/00* (2006.01)
(52) U.S. Cl. .................... 166/298; 166/55.7
(58) Field of Classification Search ............... 166/298, 166/55, 55.1, 55.7, 55.8
    See application file for complete search history.

(56) References Cited

U.S. PATENT DOCUMENTS

| | | | |
|---|---|---|---|
| 3,293,963 A * | 12/1966 | Carroll et al. ............... 83/54 |
| 3,859,877 A | 1/1975 | Sherer et al. |
| 3,983,936 A | 10/1976 | Kennard et al. |
| 4,068,711 A | 1/1978 | Aulenbacher |
| 4,220,201 A | 9/1980 | Hauk |
| 4,550,781 A | 11/1985 | Kagler, Jr. |
| 4,646,826 A | 3/1987 | Bailey et al. |
| 4,703,802 A | 11/1987 | Bryan et al. |
| 4,873,893 A | 10/1989 | Blakemore |
| 4,887,668 A | 12/1989 | Lynde et al. |
| 4,938,291 A | 7/1990 | Lynde et al. |
| 5,201,817 A | 4/1993 | Hailey |
| 5,253,710 A | 10/1993 | Carter et al. |
| 5,318,115 A | 6/1994 | Rouse |
| 5,385,205 A | 1/1995 | Hailey |
| 5,456,312 A | 10/1995 | Lynde et al. |
| 5,791,409 A | 8/1998 | Flanders |
| 5,810,079 A | 9/1998 | Lynde et al. |
| 5,823,255 A | 10/1998 | Swiatowy et al. |
| 5,899,268 A | 5/1999 | Lynde et al. |
| 6,029,745 A | 2/2000 | Broussard et al. |
| 6,125,929 A | 10/2000 | Davis et al. |
| 6,227,313 B1 | 5/2001 | Davis et al. |
| 6,357,528 B1 | 3/2002 | Davis et al. |
| 6,626,074 B1 | 9/2003 | Wheeler |
| 6,629,565 B2 | 10/2003 | Harrell |
| 6,679,328 B2 | 1/2004 | Davis et al. |
| 6,868,901 B2 | 3/2005 | Mason et al. |
| 2002/0150436 A1 | 10/2002 | Mason et al. |
| 2005/0076508 A1 | 4/2005 | Green et al. |
| 2006/0137877 A1 | 6/2006 | Watson et al. |

FOREIGN PATENT DOCUMENTS

GB    2 373 266 A    9/2002

OTHER PUBLICATIONS

International Search Report dated Sep. 15, 2008.

* cited by examiner

*Primary Examiner*—Giovanna C Wright
(74) *Attorney, Agent, or Firm*—Bracewell & Giuliani LLP

(57) ABSTRACT

The pipe cutter disclosed herein is useful for severing downhole tubulars and comprises a drive system, a pivoting system, a cutting head, and a cutting member. Cutting is accomplished by rotatingly actuating the cutting head with an associated motor, and then radially extending the cutting blades away from the cutting head. In one embodiment, the cutting head includes a cutting member that pivotally extends from the cutting head upon rotation of the cutting head.

21 Claims, 5 Drawing Sheets

TUBULAR CUTTING DEVICE

BACKGROUND OF THE INVENTION

1. Field of the Invention

The disclosure herein relates generally to the field of severing a tubular member. More specifically, the present disclosure relates to an apparatus for cutting downhole tubulars.

2. Description of Related Art

Tubular members, such as downhole tubing, pipe strings, casing for wellbores, pipelines, structural supports, fluids handling apparatus, and other items having a hollow space can be severed from the inside by inserting a cutting device within the hollow space. As is well known, hydrocarbon producing wellbores are lined with tubular members, such as casing, that are cemented into place within the wellbore. Additional members such as packers and other similarly shaped well completion devices are also used in a wellbore environment and thus secured within a wellbore. From time to time, portions of such tubular devices may become unusable and require replacement. On the other hand, some tubular segments have a pre-determined lifetime and their removal may be anticipated during completion of the wellbore. Thus when it is determined that a tubular needs to be severed, either for repair, replacement, demolishment, or some other reason, a cutting tool can be inserted within the tubular, positioned for cutting at the desired location, and activated to make the cut. These cutters are typically outfitted with a blade or other cutting member for severing the tubular. The device is also configured to rotationally advance the blade against the tubular and cut it from the inside. In the case of a wellbore, where at least a portion of the tubular member to be severed is in a vertical orientation, the cutting tool is lowered (such as by wireline, tubing, or slickline) into the casing to accomplish the cutting procedure.

BRIEF SUMMARY OF THE INVENTION

The tubing cutter disclosed herein is useful for severing downhole tubulars and comprises a drive system, a pivoting system, a cutting head, and a cutting member. Cutting is accomplished by rotatingly actuating the cutting head with an associated motor, and then radially extending the cutting blades away from the cutting head. In one embodiment, the cutting head includes a cutting member that pivotally extends from the cutting head upon rotation of the cutting head.

DETAILED DESCRIPTION OF THE INVENTION

The device disclosed herein is useful for cutting tubulars, including those disposed within a hydrocarbon producing wellbore. The device, referred to herein as a cutting tool, is capable of being inserted into a wellbore and of being secured therein. The cutting tool is equipped with a cutting member extendable from the body of the device for cutting a tubular wall in a radial configuration thereby severing the tubular. The cutting member can then be retracted from the cutting position and the device removed from within the tubular.

Figure 1:
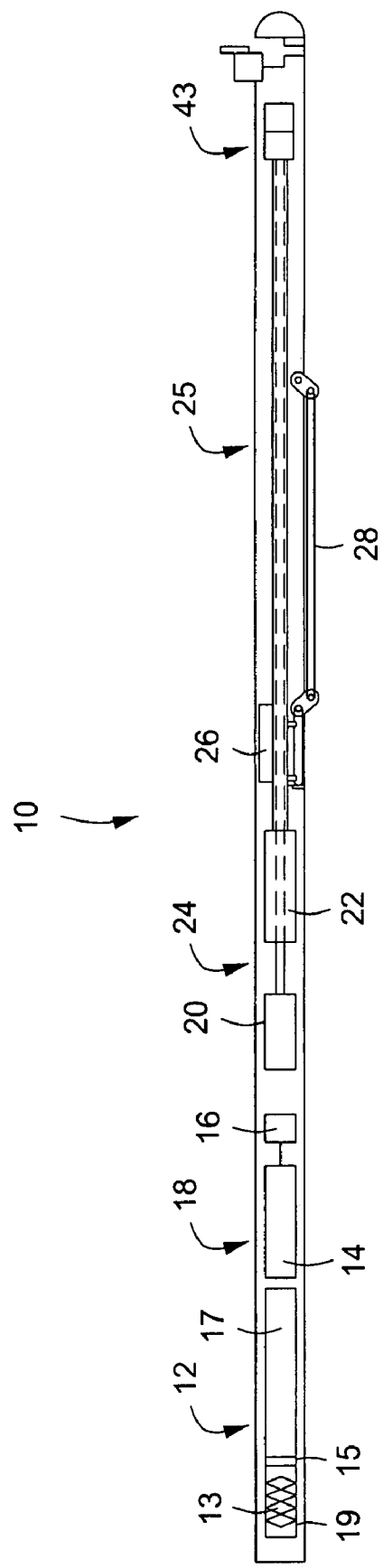
FIG. 1. is a cut away side view of an embodiment of a cutting tool.

With reference now to FIG. 1 one example of a cutting tool 10 is shown in a side cut-away view. This embodiment of the cutting tool 10 includes a compensation section 12, a pump motor 14, a pump 16, an hydraulics section 18, a feed motor 20, a main motor 22, a motor section 24, a clamping section 25, a piston 26, a clamping rod 28, and a cutting head section 43. Also optionally including with this embodiment of the cutting tool 10 is an electronic section and a cable head section (not shown).

The compensation section 12 comprises a cylinder 17 formed in the tool body. Disposed within the cylinder 17 is a piston 15 adjacent a spring 13 on the upper end of the piston 15. The compensation section 12 can adjust the inside pressure of the tool 10 to that of its ambient surroundings. The inner portion of the tool can be filled with hydraulic fluid. A port (not shown) provides pressure communication between the portion of the cylinder 17 above the piston 15 (the upper cylinder section 19). If the ambient pressure exceeds the tool pressure the piston 15 will be forced downward in the cylinder 17 thereby increasing the pressure in the tool 10 to match the ambient pressure. One advantage of a pressure compensated tool is a reduced likelihood of ambient fluid leaking into the tool 10.

The cutting head section 43 includes a cutting head having a cutting member that outwardly pivots from the cutting head. Rotating the cutting member provides a cutting function, thus the cutting tool 10 may sever the entire circumference of a tubular by rotating the cutting member while simultaneously outwardly pivoting the cutting member into cutting contact with the tubular. A drive system delivers rotational force for rotating the cutting member and the cutting head while a pivoting system provides the force for pivoting the member outward. One embodiment of the drive system comprises the main motor 22 connectable to a drive shaft 42 that drives both the cutting head rotation and cutting member.

Figure 2:
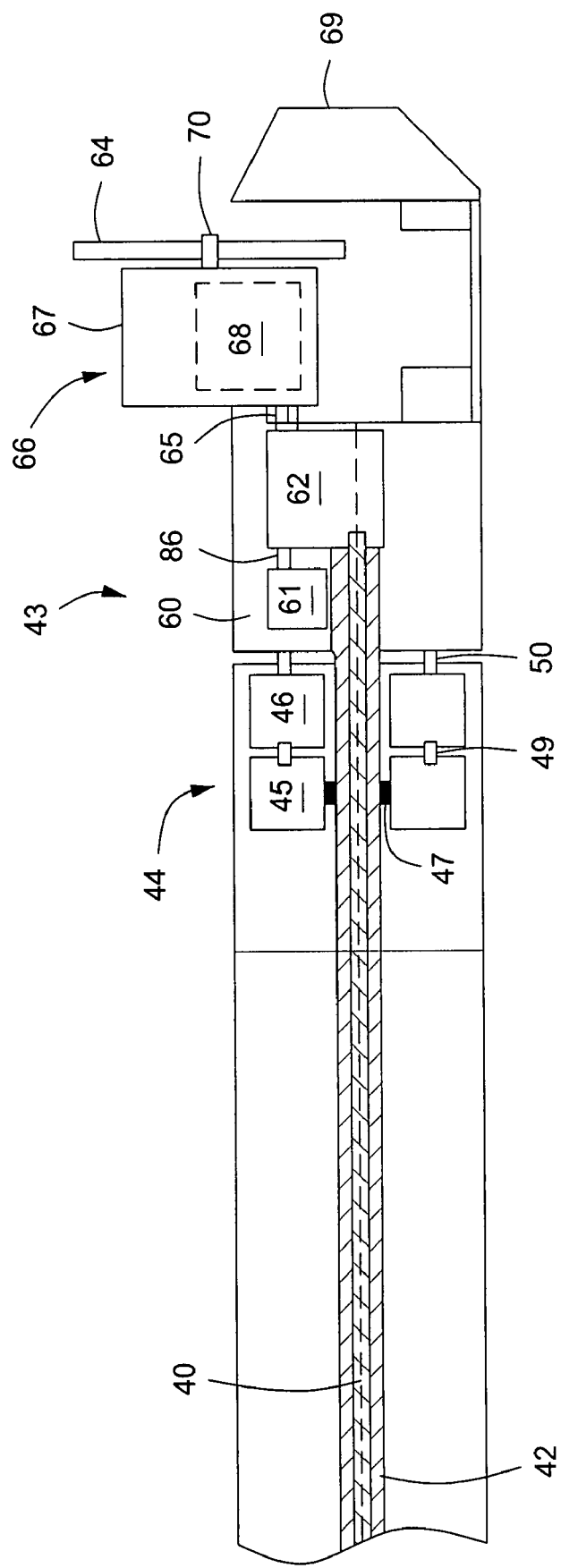
FIG. 2 is a partial cut-away side view of a portion of a cutting tool.

FIG. 2 provides a side cross-sectional view of an embodiment of the cutting head section 43. Here the drive shaft 42 is shown within a void that extends coaxially within a section of the cutting tool 10. The drive shaft itself includes an annular or hollowed out section along its axis in which resides the feed shaft 40. The drive shaft 42 is coaxially coupled with the main motor 22 on one end, and as shown in FIG. 2 couples on its other end with a cutting head gear train 44.

As shown in FIG. 2, the gear train 44 comprises a first gear box 45 and a second gear box 46, where the drive shaft 42 passes though an aperture formed along both the first and second gear boxes (45, 46). The first gear box 45 couples to the outer circumference of the drive shaft 42 along the region where the first gear box 45 circumscribes the drive shaft 42. The coupling 47 can comprise teeth or splines disposed on the inner surface of the first gear box aperture formed to mate with corresponding teeth or splines on the outer surface of the drive shaft 42. A connector 49 couples the first gear box 45 output to the second gear box 46. The second gear box 46 couples to the cutting head base 60 with connector 50. Thus the rotational motive force of the drive shaft 42 is transmitted to the cutting head base 60. The cutting head gear train 44 thus provides torque/velocity conversion between the drive shaft 42 and the cutting head base 60. Gears configured for converting velocity to torque (or vice-versa) are disposed within the first and second gear boxes (45, 46). These gears may comprise any type of gear arrangement, such as a series of spur gears, helical gears, sun/planetary gear sets, harmonic gear sets, and combinations thereof. Creating a suitable gear set is within the capabilities of those having ordinary skill in the art.

For the purposes of discussion herein, the cutting head comprises the cutting head base, the cutting member, any gear train associated with rotating the cutting member, housings for the gear train, and elements attached to the cutting head base that move in response to movement of the cutting head base.

A pivoting mechanism 62 is shown in functional block form disposed within the cutting head section 43. The pivoting mechanism 62 is coupled to the terminal end of the feed shaft 40 on one end and to the cutter assembly 66 on its other end via shaft 65. The pivoting mechanism 62 provides a pivoting force that rotates the cutter assembly 66 from a retracted position within the tool 10 and feeds the cutter assembly 66 into a cutting position outside the tool 10. In one embodiment the pivoting mechanism includes a series of gears disposed therein that transmit rotational force received from the feed shaft 40 to pivot the cutter assembly 66 outward. In the embodiment of FIG. 2, the cutting member 64 is shown extended outward into a cutting position. When in the retracted position it is housed within the cutting member shroud 69. Thus by operating the feed shaft 40 in either a clockwise or a counter-clockwise direction the cutter body 67 may be selectively moved in and out of an extended or a retracted position.

Figure 3:
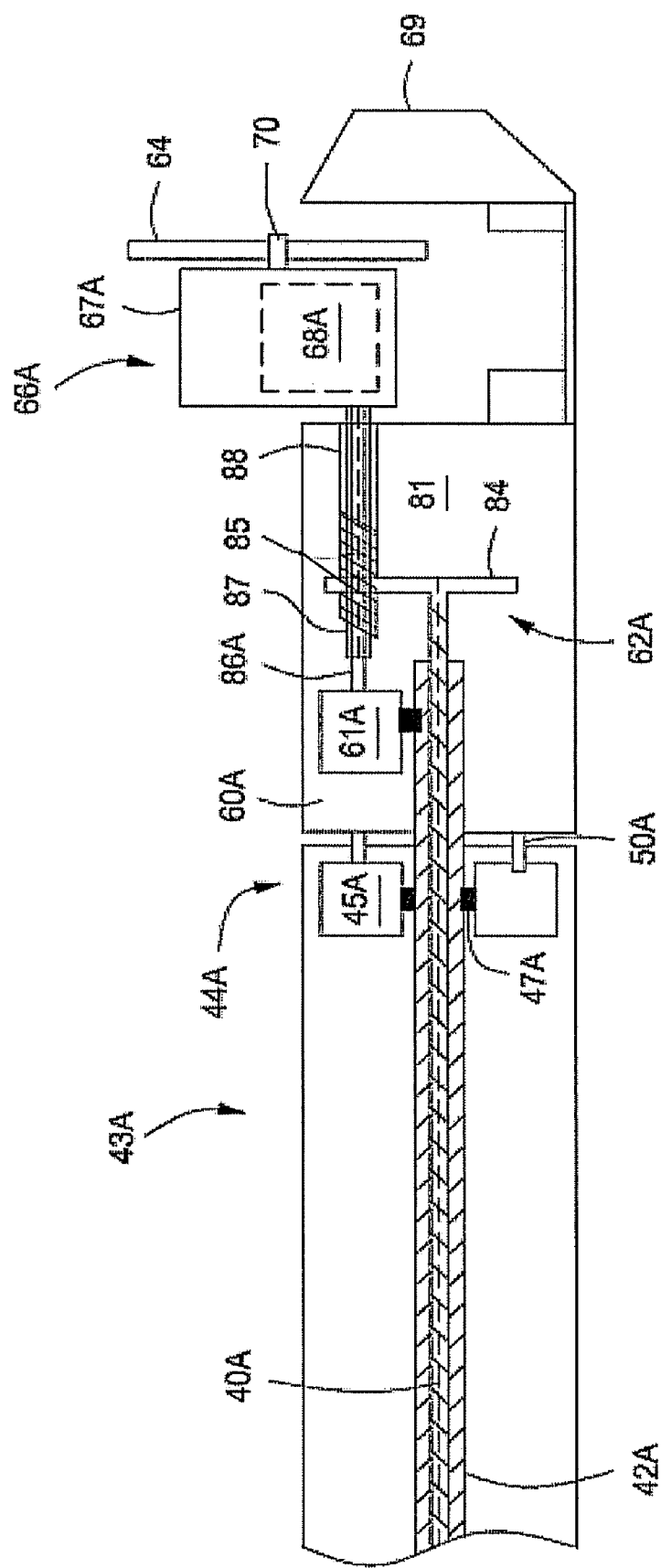
FIG. 3 is a partial cut-away side view of an alternative embodiment of a cutting tool.

An optional embodiment of the cutting head section 43a is provided in cross sectional side view in FIG. 3. In this embodiment the feed shaft 40a extends substantially along the center axis of the cutting head section 43a and is disposed within the annular hollowed section of the drive shaft 42a. The drive shaft 42a couples, via a coupling 47a, to a first gear box 45a of a gear train 44a; the gear box 45a couples to the cutting head base 60a with connector 50a. Disposed on the lower end of the feed shaft 40a is a pivoting mechanism 62a having a pivot member 84. The cross sectional configuration of the pivot member is substantially L-shaped and having an aperture 85 formed through its upper end. Configured to fit within the aperture 85 is a helical gear 88. Corresponding teeth and/or grooves (not shown) are provided on the aperture 85 and formed to mate with the gear teeth 87 or grooves formed on the outer circumference of the helical gear 88. Thus by moving the pivot member 84 along the length of the helical gear 88, the cooperation of these grooves on the aperture 85 and the helical gear teeth 87 causes rotation of the helical gear 88. As shown, an open space 81 is provided adjacent the pivot member; thus by moving the pivot member 84 into the open space the aperture 85 travels along a portion of the length of the helical gear 88. The mating cooperation of the respective grooves and teeth between the aperture and the helical gear rotate the helical gear thereby imparting a pivoting motion on the cutter assembly 66a. Thus rotation of the helical gear 88 pivots the cutting member 64 from within the cutting head section 43a out into a cutting configuration. Additionally, while urging the feed shaft 40a linearly along the length of the cutting head section 43a towards its lower end, outward pivoting can be accomplished, pulling the feed shaft 40a away from the lower end and draw the cutter assembly 66a back within the confines of the cutting head section 43a. Moreover, the cutting operation can be such that pivoting can occur during rotation of the cutting member 64 such that a cut in a tubular can take on a spiraling configuration.

As discussed above, in addition to rotating the cutting head, the drive shaft 42 also imparts a rotating motion onto the cutting member 64. As shown in the embodiments of FIGS. 2 and 3, a first cutting member gear box 61, 61a is coupled to the lower end of the drive shaft 42, 42a. The manner of coupling may comprise splines or teeth formed on the drive shaft 42, 42a configured to mate with corresponding splines included with the first cutting member gear box 61, 61a. Other means may be employed for coupling the cutting member gear box 61, 61a to the drive shaft 42, 42a, such as a belt drive. Set apart and substantially parallel to the drive shaft 42, 42a is a cutter member drive shaft 86, 86a extending from the gear box 61, 61a output and terminating at a second cutting member gearbox 68, 68a. The second cutting member gearbox 68, 68a is shown in dashed outline disposed within the cutter body 67, 67a of the cutter assembly 66, 66a. The cutting member 64 is mounted on a shaft 70 connected to the cutting member second gear box output. Thus drive shaft 42, 42a rotation in turn rotates the cutting member 64 via the drive shaft 42, 42a cooperation with the cutting member first gearbox 61, 61a and the cutting member second gearbox 68, 68a. In the embodiment of FIG. 2, the shaft 86 passes through the pivot mechanism to the cutter assembly 66. In the embodiment of FIG. 3, the shaft 86a is coaxially disposed within the helical gear 88 and terminates at the cutting member second gearbox 68a.

The feed shaft 40 can be rotationally manipulated or laterally moved along the tool axis. When rotationally manipulated the feed shaft 40 may be directly connected to the feed motor output and rotated at the same speed and torque of the motor 20. With regard to the embodiment of FIG. 3, the feed shaft 40a will not be directly connected to the feed motor output, but instead manipulated by a screw gear type arrangement (not shown) driven by the feed motor. In this alternative embodiment the screw gear arrangement comprises a screw gear coupled with a mandrel, where the mandrel is axially disposed within the cutting tool 10. The mandrel has an annular opening along its axis grooved to mate with the screw gear so that rotating the screw gear in turn urges the mandrel in a lateral direction along the tool axis. The feed shaft 40a is mechanically coupled to the mandrel, thus laterally moving the mandrel in turn pushes the feed shaft 40a. The feed motor 20 is connected to the screw gear, thus activating the feed motor 20, rotates the screw gear, that moves the mandrel thus downwardly pushing the feed shaft 40a. As discussed above, downwardly moving the feed shaft 40a pushes the pivot member 84 along the helical gear 88 thereby pivoting the cutter assembly 66a. A spring may be provided adjacent the mandrel that becomes compressed while laterally urging the mandrel. Removing the pushing force allows the spring to decompress thereby moving the mandrel back to its original position that upwardly pulls the feed shaft 40a and pivots the cutter assembly 66a back within the confines of the shroud 69.

Figure 4:
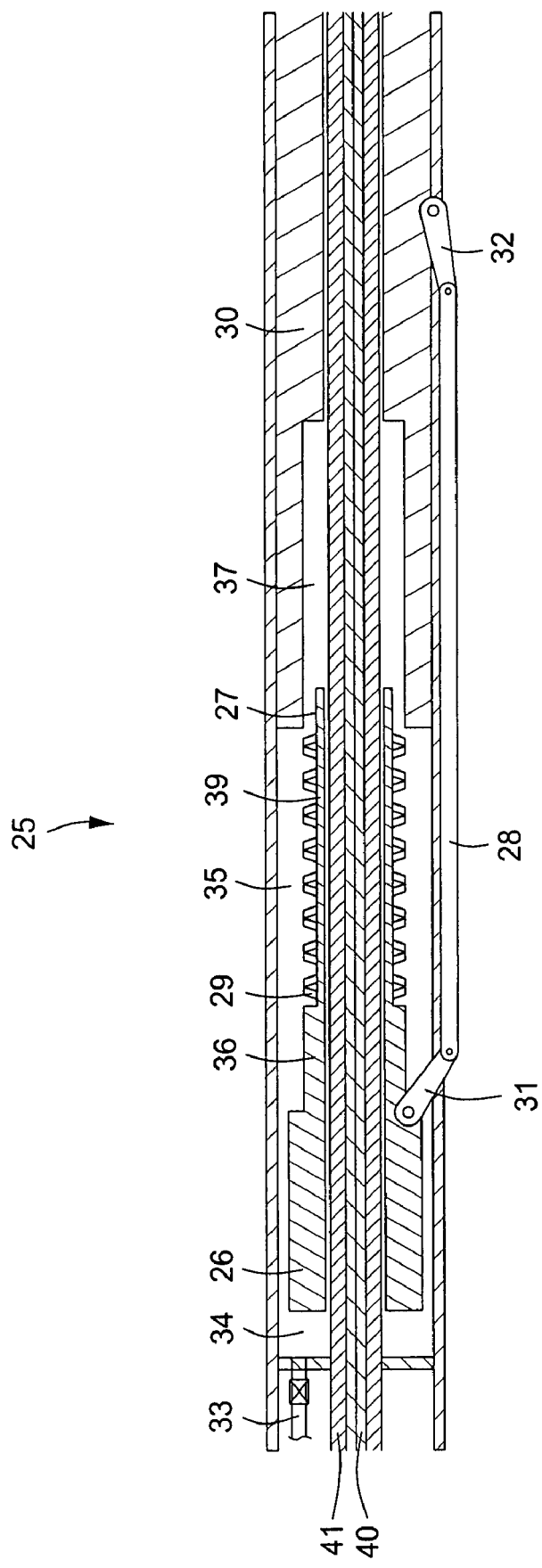
FIG. 4 is a partial cut away view of an embodiment of a clamping section of a cutting tool.

An embodiment of a clamping section 25 combinable with the cutter tool 10 is provided in side cut away view in FIG. 4. This embodiment includes the piston 26 coaxially disposed within a cylinder 34 formed lengthwise along a portion of the clamping section body 30. The piston 26 is also mechanically coupled to the clamping rod 28 via a hinge 31. A spring 29 is provided within an annular section 27 formed within the clamping section body 30. The spring 29 may comprise a single coiled spring as well as a series of stacked washers. Anchoring the cutter tool 10 (within a tubular) is accomplished by supplying pressurized hydraulic fluid into the cylinder 34. The hydraulic fluid may be injected through a hydraulic feed line 33. The pressurized hydraulic fluid should have sufficient pressure for urging the piston against the spring 29 and to compress the spring 29. The pump motor 14 and pump 16 may be employed to pressurize and deliver hydraulic fluid to the cylinder 34.

As noted above, the piston 26 is linked to the clamping rod 28 via a hinge 31. The hinge is pinned at its first end to the piston 26 and its second end to the clamping rod 28. Thus lateral movement of the piston 26 along the cylinder 34 rotates the hinge 31 in a clockwise direction thereby urging the clamping rod 28 outward. Similarly a corresponding hinge 32 is provided on the distal end of the clamping section 28. This hinge 32 is also affixed to the clamping rod 28 via a pin. The hinge 32 rotates clockwise with outward movement of the clamping rod 28. Additional clamping rods 28 with associated hinges (31, 32) may be provided with the tool 10. The rods 28 may be disposed radially around the tool at the same axial location on the tool 10 or at different axial locations.

While the cutting tool 10 is anchored within a tubular, the hydraulic fluid may be stored within the cylinder 34 by maintaining a pressure upstream of the hydraulic feed line 33 or simply closing a valve thereby trapping the hydraulic fluid in the cylinder. Un-anchoring the cutting tool 10 from within the casing thus may involve releasing the hydraulic pressure or opening the valve, either method will enable hydraulic fluid to escape the cylinder 34 through the feed line 33. Since the spring 29 is compressed during clamping, subsequent release of pressure on the piston 26 will eventually allow the spring 29 to expand back to its normal position thereby pushing the piston 26 back through the cylinder 34. A shoulder 36 is formed on the lower end of the piston to provide a surface upon which the end of the spring 29 can push against the piston 26. Upwardly urging the piston rotates the hinge 31 into a counter clockwise direction that in turn will draw the clamping rod 28 against the inner circumference of the clamping section 25. Drawing in the clamping rod 28 thereby releases the cutter tool 10 from within the tubular.

The piston 26 and clamping section body 30 is configured to limit downward travel of the piston 26. The configuration includes an elongated section on the piston lower end 39; the lower end 39 has a generally annular configuration. An annular recess 37 is coaxially formed within the body 30 that extends past the terminal end of the annular section 27. The travel of the piston 26 within the body 30 is limited by the annular recess 37 length.

Figure 5B:
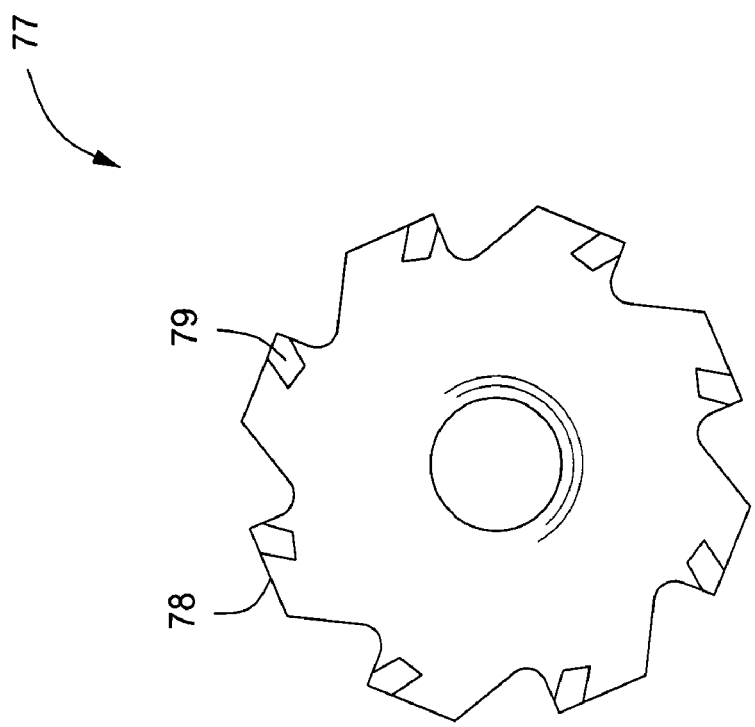
FIGS. 5a and 5b are side views of embodiments of a cutting member.
Figure 5A:
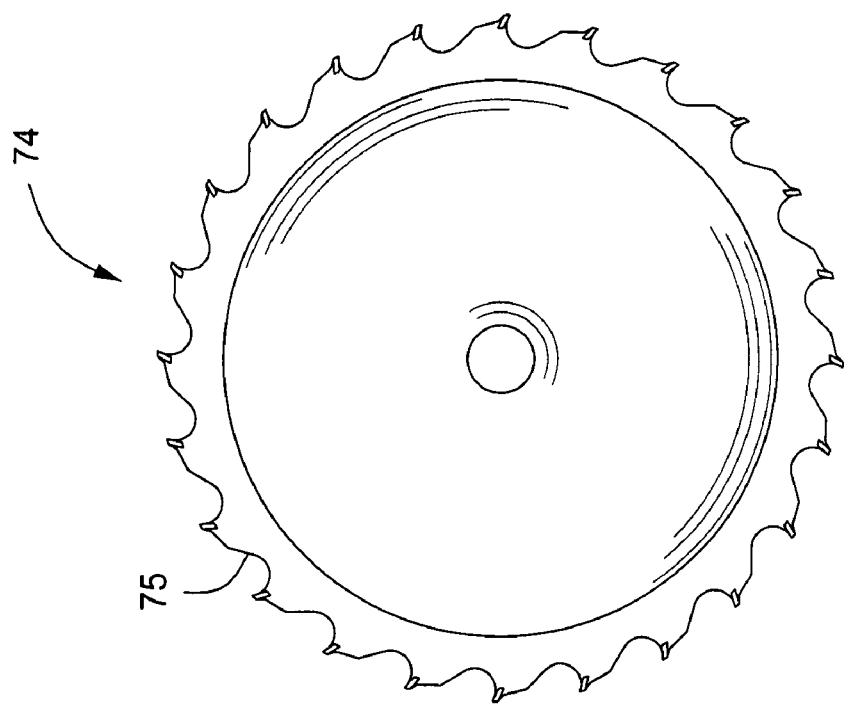

FIGS. 5a and 5b include optional cutting members embodiments. FIG. 5a illustrates a side view of a saw blade 74 having a plurality of cutting teeth 75 formed along its outer circumference. FIG. 5b is a perspective view of a milling blade 77 having a plurality of teeth 78. The milling blade 77 includes the potential for adding an inlay 79 at the face of the cutting tooth. The inlay can be the same or different material used to make the rest of the milling blade 77. Blade and inlay materials may include carbon steel, inconel, stainless steel, and combinations of these materials. Moreover, the blade teeth and inlays can carbide or diamond tips. A grinding wheel may also be used as the cutting member, in addition to the saw blade and milling blade. Combinations of these can also be used.

In an example of cutting tool 10 operation, the cutting tool 10 is disposed into a tubular, anchored within the tubular, and the cutting head and cutting member is activated. Disposing the cutting tool 10 within a wellbore may involve use of a wireline, tubing, slickline, or any other wellbore conveyance means. As discussed above, activation of the cutting head and cutting member includes energizing the drive system and the pivoting system. To sever a tubular, the cutting member is rotated and simultaneously outwardly pivoted into cutting contact with the tubular. Severing the tubular further includes rotating the member in a 360° arc as it is pivoted outward. In one example of use, the member is manipulated in an expanding spiraling fashion until the tubular is completely severed. The spiraling action can be accomplished by a combination of rotating the base on which the cutting member is secured and pivoting the cutting member outward at the same time.

Control of the tool includes activating and deactivating the tool components (such as the anchor, feed motor, drive motor, etc) as well as regulating the force, speed, and power of and delivered to the components. Moreover, control can be performed by components within the electronic section, such as processors or other information handling systems. Control commands can be transmitted to the electronic section via a wireline or telemetry, optionally the commands can be stored within the components themselves or media in communication with the components. The cutting tool control discussed herein includes controlling the feed rate, i.e. the angular rate at which the cutter assembly 66 (with cutting member 64) is rotated or pivoted. The feed rate can be controlled at a rate that is independent of the cutting head rotation rate. Cutting tool control involves varying the power supplied to the cutting head and cutting member rotation as well as the pivoting power. Additionally the feed force (force of pivot) as well as force applied to the cutting blade can be controlled.

The main motor 22 provides the requisite motive force for rotating the cutting head and rotating the cutting member. The main motor 22 is part of a drive system that further comprises the drive shaft, and gear trains (which include the cutting head and cutting member gear trains). The force for pivoting the cutting member is provided by the feed motor 20. The pivoting action of the cutting member is supplied by the pivoting system that comprises the feed motor 20, the feed shaft 40, and the above described pivot mechanism 62. The main motor 22 and the feed motor 20 can be electric motors, hydraulic motors, or driven by pressurized wellbore fluids (mud motor).

In one mode of cutting tool 10 operation the cutting tool is disposed within a tubular, such as a wellbore casing. The cutting tool 10 is lowered to a depth such that the cutting member is disposed proximate to the portion of the tubular that is desired to be severed. Control for anchoring the cutting tool 10 is then actuated. This can be done from surface such as a surface control truck or can be stored within the electronic section of the cutting tool 10. As discussed previously the clamping section is activated by adding pressurized hydraulic fluid to the clamping section 25, that in turn extends the clamping rod 28 into secure engagement with a surrounding tubular. Once the cutting tool 10 is securely fastened within the tubular, activation of the cutting member may be initiated. Activation of the cutting member is provided both through the drive system and the pivoting system. The drive system, which comprises a motor coupled to a drive shaft (42, 82) that both rotates the cutting head and provides a spinning rotating motion for the cutting member (64, 92). Cutting head rotation is produced by rotating the cutting head base by a virtue of rotation of the drive shaft (42, 82) and cooperation with the cutting head gear train 44.

Again the pivoting of the cutting member, is produced by outwardly rotating the cutting device from within its cutting member shroud 68. As noted above, pivoting of the cutting device can be accomplished simultaneously with rotation of the cutting member (64, 92). One of the advantages of pivoting while rotating is that smaller cuts in the tubular can be accomplished while rotating the cutting member within the inner circumference of the tubular. A more shallow cutting depth thereby allows a cutting action without the need for large torques used to cut or mill away material from within the tubular. As such one mode of operation of the device disclosed herein involve the spiraling action of the cutting member within the inner circumference of the tubular. Spiraling of the cutting member entails gradually urging the member into cutting action in the tubular and increasing the cutting depth with increased angular rotation of the cutting head. Optionally, successive step wise function cuts could also be performed where the cutting member is set to a specified cut depth with each single rotation of the cutting head; then the depth of cut can be increased at the next successive rotation. This sequence of increased cutting depths of each rotation can be repeated until the cutting head has fully severed through the entire thickness of the tubular.

One of the important and innovative features of the present design is the ability to control the cut ratio of the cutting head rotation with respect to the cutting member rotation. In one mode of operation this ratio ranges from about 1000 revolutions of the cutting member to about 2000 revolutions of the cutting member with every rotation of the cutting head. Optionally this ratio could be from 1250 revolutions to about 1750 revolutions for every one rotation of the cutting head. Yet further optionally this value could be about 1500 revolutions of the cutting member for every one rotation of the cutting head. Optionally, the gear boxes (44, 61, 68) can be modularized and configured for replacement with other gear boxes having different gear ratios. This function enables cutting head to cutting member ratios to be adjusted onsite by changing the modular gear boxes.

Also included within the scope of the present disclosure is a control system for regulating the cutting member rotation. Regulation the cutting member cutting torque and/or rotational velocity may be necessary when the tubular being cut has irregularities in its material and/or material composition. For example, it is possible that a region of the tubular may have increased hardness or toughness. To prevent cutting member damage, it may be necessary to temporarily adjust the cutting member rotational velocity and/or torque. Monitoring the power requirements of the drive system and pivot system and adjusting the power delivered to these systems may accomplish this.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. Additionally, the device can be used in conjunction with downhole drilling or other boring operations. Moreover, it should be pointed out that the force and/or torque transmission systems heretofore described are not limited to the embodiments described, but can also include belt systems, pulleys, linkages, and any other manner of transferring kinetic (rotational, translational, or otherwise) energy from one member to another. Additionally, the control scheme may be performed by an information handling system, either disposed with the tool or at surface. These and other similar modifications will readily suggest themselves to those skilled in the art, and are intended to be encompassed within the spirit of the present invention disclosed herein and the scope of the appended claims.

What is claimed is:

1. A tubular cutting device comprising:
    a drive system having a drive shaft connected to a main motor;
    a cutting head coupled to the drive shaft;
    a cutting member coupled to the drive shaft; and
    a pivoting mechanism mechanically coupled with the cutting member on one end and to a feed motor on another end.

2. The cutting device of claim 1, wherein the cutting member is substantially circular.

3. The cutting device of claim 1, wherein the cutting member is selected from the list consisting of a saw blade, a milling blade, a grinding wheel and combinations thereof.

4. The cutting device of claim 1 wherein the drive system further comprises a gear train coupled on one end to the drive shaft and on the other end to the cutting head.

5. The cutting device of claim 4 wherein the drive system further comprises a second gear train coupled on one end to the drive shaft and on the other end to the cutting member.

6. The cutting device of claim 5, wherein the ratio of the cutting member rotation to cutting head rotation ranges from about 1000:1 to about 2000:1.

7. The cutting device of claim 5, wherein the ratio of the cutting member rotation to cutting head rotation ranges from about 1250:1 to about 1750:1.

8. The cutting device of claim 5, wherein the ratio of the cutting member rotation to cutting head rotation is about 1500:1.

9. The cutting device of claim 4, further comprising a motor selected from an electric motor or a hydraulic motor.

10. The cutting device of claim 1 wherein the pivoting mechanism comprises a gear train coupled on one end to the feed shaft and on the other end to the cutting member.

11. The cutting device of claim 1 wherein the pivoting mechanism comprises a linear motion to pivoting motion linkage.

12. The cutting device of claim 11 wherein the linkage comprises a helical gear in mechanical cooperation with the cutting member, a feed shaft, and a pivot plate disposed on an end of the feed shaft, wherein the pivot plate is configured to receive the helical gear therethrough.

13. The cutting device of claim 1 further comprising an anchoring system.

14. The cutting device of claim 13, wherein the anchoring system comprises an extendible clamping member hingedly affixed to the cutting device.

15. The cutting device of claim 1 further comprising a control system.

16. The cutting device of claim 15, wherein the control system regulates motive power to the drive system.

17. The cutting device of claim 16, wherein motive power to the cutting member is regulated such that the cutting member is responsive to variations in cutting requirements.

18. A method of cutting a tubular comprising:
    disposing a cutting tool in the tubular, wherein the cutting tool comprises a body, a main motor, a feed motor, and a cutting member;
    rotating the cutting member about the cutting member axis using the main motor;
    outwardly pivoting the rotating cutting member away from the body into cutting contact with the tubular using the feed motor; and
    rotating the cutting member about the body axis using the main motor thereby cutting the tubular in a spiral pattern.

19. The method of claim 18, wherein the step of outward pivoting is performed with a pivoting mechanism.

20. The method of claim 19, wherein the pivoting mechanism is selected from the list consisting of a gear train connected to the feed motor and a rotational motion to linear motion device connected to the feed motor.

21. The method of claim 20, wherein the rotational motion to linear motion device comprises a helical gear.

* * * * *